United States Patent
Glavic et al.

(10) Patent No.: US 11,646,811 B2
(45) Date of Patent: May 9, 2023

(54) ALIEN WAVELENGTH MANAGEMENT

(71) Applicants: Zayo Group, LCC, Boulder, CO (US);
Lynk Lab, Inc., Sebastopol, CA (US)

(72) Inventors: Ljubomir Glavic, Mississauga (CA);
Jennifer Hawkins, Sebastopol, CA (US); Eric Litvin, Sebastopol, CA (US); Morgan Snyder, Los Altos Hills, CA (US); Aaron Werley, Erie, CO (US)

( * ) Notice: Subject to any disclaimer, the term of this patent is extended or adjusted under 35 U.S.C. 154(b) by 0 days.

(21) Appl. No.: 17/497,142

(22) Filed: Oct. 8, 2021

(65) Prior Publication Data
US 2023/0111987 A1     Apr. 13, 2023

(51) Int. Cl.
*H04J 14/00*     (2006.01)
*H04J 14/02*     (2006.01)

(52) U.S. Cl.
CPC ........ *H04J 14/022* (2013.01); *H04J 14/0208* (2013.01); *H04J 14/0213* (2013.01); *H04J 14/0298* (2013.01)

(58) Field of Classification Search
CPC .. H04J 14/022; H04J 14/0208; H04J 14/0213; H04J 14/0298
USPC .......................................................... 398/59
See application file for complete search history.

(56) References Cited

U.S. PATENT DOCUMENTS

| | | |
|---|---|---|
| 9,191,117 B2 | 11/2015 | Alexander et al. |
| 2009/0279888 A1 | 11/2009 | Butler et al. |
| 2018/0076919 A1* | 3/2018 | Yilmaz ................ H04B 10/506 |

OTHER PUBLICATIONS

Anonymous, Infinera Corporation White Paper, "Future-proof Open Line Systems for Cloud Scale Networks", https://www.infinera.com/wp-content/uploads/infinera-wp-Future-proof-Open-Line-Systems-Cloud-Scale-Networks.pdf, retrieved Jun. 25, 2021.
Jonathan Homa, "Alien Wavelengths to Shared Spectrums", https://ribboncommunications.com/company/media-center/blog/alien-wavelengths-shared-spectrum, retrieved Jun. 25, 2021.

* cited by examiner

*Primary Examiner* — Mohammad R Sedighian
(74) *Attorney, Agent, or Firm* — Drew Smith

(57) ABSTRACT

Systems and methods for alien wavelength management. One embodiment is an apparatus for managing alien wavelengths for a Wavelength Division Multiplexing (WDM) system. The apparatus includes memory to store signal thresholds for alien wavelength signals transmitting over the WDM system, wherein the alien wavelength signals are generated by third-party equipment independently controlled from the WDM system. The apparatus also includes an Alien Wavelength Control Unit (AWCU) coupled between the third-party equipment and a channelization port of the WDM system, the AWCU configured to measure a signal parameter of an alien wavelength signal transmitted by the third-party equipment to the channelization port. The apparatus further includes a controller coupled with the AWCU and configured, in response to determining that the signal parameter is outside a signal threshold of the WDM system, to direct the AWCU to modify the alien wavelength signal to protect the WDM system.

20 Claims, 10 Drawing Sheets though the common optical line system fiber optic network, and to modify alien wavelength signals violating signal transmission specifications to protect the transponders.

ALIEN WAVELENGTH MANAGEMENT

FIELD

The invention generally relates to fiber optic networks and, more particularly, to alien wavelengths in a Wavelength Division Multiplexing (WDM) system.

BACKGROUND

Telecommunication networks use fiber optic cables to meet the requirements of high-speed, large-capacity, and long-haul transmission. To maximize the transmission capacity of fiber, a technology known as Wavelength Division Multiplexing (WDM) may be deployed. WDM increases bandwidth by allowing different data streams to be sent simultaneously over a single optical fiber line.

So-called "Alien" wavelength technology has emerged as a cost-effective option to progressively scale bandwidth in WDM networks. An alien wavelength, or wave, is a signal that is transported transparently over third-party equipment. Alien waves enable network operators and customers to source their transponders from any vendor based on their business or technical specifications. However, current WDM systems are limited in their ability to effectively manage alien wavelengths to ensure other customer's traffic in the WDM system is unaffected by nonconforming alien wavelengths.

SUMMARY

Systems and methods presented herein provide alien wavelength management. One or more alien wavelength managers, each comprising a stand-alone device deployed in-line with customer equipment of an optical line system, are configured to automatically manage alien wavelengths for a WDM system. This advantageously enables a fiber optic communication system to implement a disaggregated system using any customer's third-party transponders to operate with the fiber network without disruptions or data exposure to other users of the common optical line system.

One embodiment is an apparatus for managing alien wavelengths for a Wavelength Division Multiplexing (WDM) system. The apparatus includes memory configured to store one or more signal thresholds for alien wavelength signals transmitting over the WDM system, wherein the alien wavelength signals comprise signals generated by third-party equipment independently controlled from the WDM system. The apparatus also includes an Alien Wavelength Control Unit (AWCU) coupled between the third-party equipment and a channelization port of the WDM system, the AWCU configured to measure a signal parameter of an alien wavelength signal transmitted by the third-party equipment to the channelization port. The apparatus further includes a controller coupled with the AWCU and configured, in response to determining that the signal parameter is outside the one or more signal thresholds of the WDM system, to direct the AWCU to modify the alien wavelength signal to protect the WDM system.

In a further embodiment, the controller is configured, in response to determining that a measured power level of the alien wavelength deviates a first level from a threshold, generate a warning message for an end-user of the third-party equipment regarding non-compliance of the alien wavelength signal. In response to determining that the measured power level of the alien wavelength deviates a second level from the threshold greater than the first level, the controller directs the AWCU to attenuate or amplify the alien wavelength to a power level within the threshold to create a modified alien wavelength signal, and directs the AWCU to transmit the modified alien wavelength signal to the WDM system. And, in response to determining that the measured power level of the alien wavelength deviates a third level from the threshold greater than the second level, the controller directs the AWCU to disable the alien wavelength signal from transmitting over the WDM system.

In yet a further embodiment, the AWCU includes a Variable Optical Attenuator (VOA) with a shutter, and the controller is configured, in response to determining that the measured power level of the alien wavelength deviates the second level from the threshold, to direct the VOA to attenuate or amplify the alien wavelength to a power level within the threshold. The controller is further configured, in response to determining that the measured power level of the alien wavelength deviates the third level from the threshold, to direct the shutter to break a transmission path of the alien wavelength signal. In one embodiment, the AWCU includes a PIN diode to measure a power level of the alien wavelength signal.

In other embodiments, the controller is configured, in response to determining that a measured spectral occupation of the alien wavelength signal is outside a spectral occupation range threshold stored in the memory, to direct the AWCU to disable the alien wavelength signal from transmitting over the WDM system. In one embodiment, the AWCU includes an optical tap to split the alien wavelength signal, and the apparatus further includes a spectrometer to measure spectral occupation of the alien wavelength signal after it splits from the optical tap. In another embodiment, the AWCU includes a Microelectromechanical Systems (MEMS) filter to block the alien wavelength signal. In yet another embodiment, the AWCU includes a Wavelength Selective Switch (WSS) to modify the alien wavelength signal.

Another embodiment is a method of managing alien wavelengths in a Wavelength Division Multiplexing (WDM) system. The method includes storing one or more signal thresholds in memory for alien wavelength signals transmitting over the WDM system, wherein the alien wavelength signals comprise signals generated by third-party equipment independently controlled from the WDM system. The method also includes measuring a signal parameter of an alien wavelength signal transmitted by the third-party equipment to a channelization port of the WDM system. The method further includes, in response to determining that the signal parameter is outside the one or more signal thresholds of the WDM system, modifying the alien wavelength to protect the WDM system.

Yet another embodiment is a system for managing alien wavelengths for an open optical line system operated by a supplier. The system includes first alien wavelength managers disposed at an input of the open optical line system. The first alien wavelength managers are configured to receive alien wavelength signals from corresponding first transponders, and to modify one or more alien wavelength signals violating signal transmission specifications to protect the open optical line system, wherein the first transponders are operated by multiple vendors different from the supplier of the open optical line system. The system also includes second alien wavelength managers disposed at an output of the open optical line system and in communication with corresponding second transponders operated by the multiple vendors. Each second alien wavelength manager is configured to receive the alien wavelength signals transported over the open optical line system, to transmit an alien wavelength to a second transponder intended for the alien wavelength, and to filter other alien wavelengths not intended for the second transponder.

The various embodiments disclosed herein may be implemented in a variety of ways as a matter of design choice. For example, the embodiments may take the form of computer hardware, software, firmware, or combinations thereof. Other example embodiments are described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
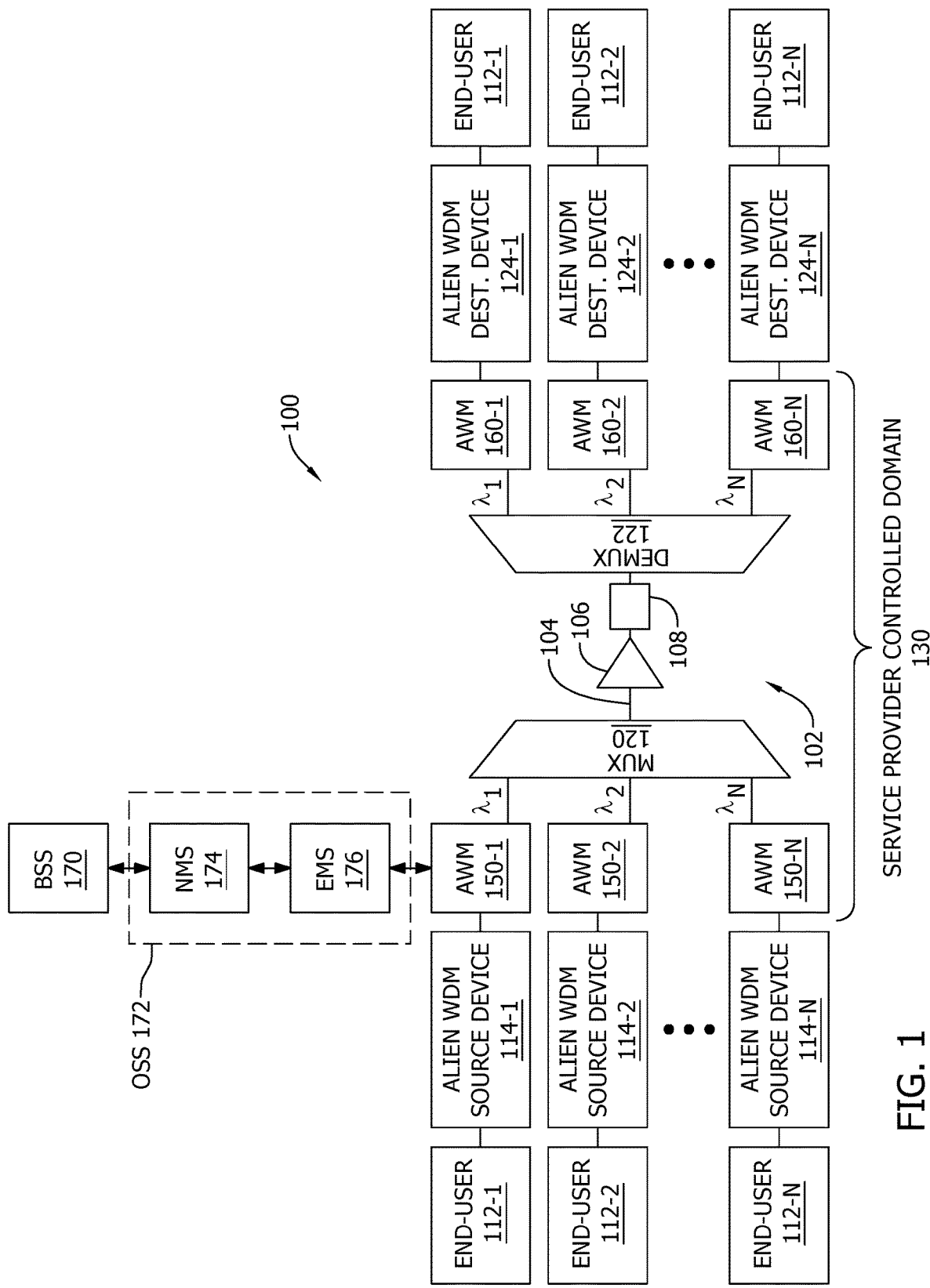
FIG. 1 is a block diagram of a fiber optic communication system in an illustrative embodiment.

FIG. 1 is a block diagram of a fiber optic communication system 100 in an illustrative embodiment. The fiber optic communication system 100 employs a Wavelength Division Multiplexing (WDM) system 102 to carry optical signals over a fiber optic line 104. The WDM system 102 includes a multiplexer 120 to combine multiple wavelengths onto one fiber, and a demultiplexer 122 to separate out all the individual wavelengths of the composite signal to individual fibers. The WDM system 102 may also include one or more optical amplifiers 106 on the fiber optic line 104 to boost or add gain to optical signals for long transmission links, and one or more reconfigurable optical add/drop multiplexers (ROADMs) 108 along the fiber span to add or remove specific wavelengths on the fiber optic line 104. Although the fiber optic communication system 100 supports bi-directional communication FIG. 1 illustrates a unidirectional, left-to-right signal transmission for discussion purposes. For example, components left of the multiplexer 120 may represent a transmitting or on-ramp side and components right of the demultiplexer 122 may represent a receiving or off-ramp side.

The fiber optic communication system 100 includes alien WDM devices 114/124 that communicate alien wavelength signals over the WDM system 102. In particular, at the on-ramp side, alien WDM source devices 114 generate/transmit alien wavelength signals. At the off-ramp side, alien WDM destination devices 124 receive the alien wavelength signals. As used herein, the term alien wavelength refers to a signal generated by third-party equipment outside the control of the WDM system 102. The alien WDM devices 114/124 may be supplied by respective end-users 112, sometimes referred to as a customer, third-party manufacturer, or third-party vendor. The WDM devices 114/124 may comprise optical transceivers or optical transponders. A transponder and transceiver are functionally similar devices operable to convert between a full-duplex electrical signal and a full-duplex optical signal. Typically, a transceiver interfaces electrically with a host system using a serial interface, whereas a transponder uses a parallel interface to do so. For example, an optical transceiver may comprise a L1/L2/L3 device with integrated, discrete or pluggable optics.

Accordingly, a network operator that owns and operates the WDM system 102 may lease a shared spectrum (or alien spectrum) to end-users 112 that use alien WDM devices 114/124 provided and controlled by a third-party unrelated to the network operator. The service provider controlled domain 130 shown in FIG. 1 illustrates the portion of the fiber optic communication system 100 controlled by the network operator, wherein components outside that domain may be subject to the control of outside vendors. The fiber optic communication system 100 may thus implement a so-called open line system, or disaggregated system, in which the optical line system is decoupled from end terminals and operators may expand their network at any time with the technology and alien WDM devices 114/124 of their choice.

However, while open and disaggregated optical networks offer several advantages, the use of alien wavelengths can present several issues. In particular, the implementation of alien wavelengths can complicate a network provider's task of ensuring performance standards of their network is maintained since the optical signals may be generated and controlled by third parties. Additionally, existing WDM systems are not designed to support effective demarcation of an optical signal handed over as an alien wavelength or to mitigate situations where an alien wave is jeopardizing the rest of the traffic.

The fiber optic communication system 100 is therefore enhanced with one or more alien wavelength managers 150/160 to automatically govern alien wavelengths submitted for transmission over the WDM system 102. The alien wavelength managers 150/160 comprise stand-alone hardware entities deployed in-line with one or more corresponding alien WDM devices 114/124. At the on-ramp side, one or more first alien wavelength managers 150 are deployed in-line with one or more corresponding alien WDM source devices 114 and are configured to prevent nonconforming alien wavelengths submitted by the alien WDM source devices 114 from disrupting the WDM system 102. At the off-ramp side, one or more second alien wavelength managers 160 are deployed in-line with one or more corresponding alien WDM destination devices 124 and are configured to adjust or filter alien wavelength signals so that end-users 112 receive the intended signal. Further details regarding on-ramp and off-ramp functionality of the alien wavelength managers 150/160 and associated technical benefits are provided below.

The network operator may manage various aspects of the WDM system 102, including alien wavelength managers 150/160, using a network management hierarchy including one or more business support systems (BSS) 170, operations support systems (OSS) 172, network management systems (NMS) 174, and element management systems (EMS) 176. Each EMS 176 may manage a single alien wavelength manager at a node level, the NMS 174 may manage alien wavelength managers 150/160 at a network level, and the OSS 172 may manage the network end-to-end including single or multiple vendors. While single connection points stemming from a single alien wavelength manager is shown for ease of illustration, it will be appreciated that any or all of the alien wavelength managers 150/160 may be managed according to various network management hierarchies. Additionally, although a particular arrangement and combination components of the fiber optic communication system 100 are shown and described with respect to FIG. 1, it will be appreciated that alien wavelength managers 150/160 may be implemented in other network deployments or systems similar to WDM systems known by alternative names, including for example, Dense Wavelength Division Multiplexing (DWDM) systems, Reconfigurable Optical Add/Drop Multiplexing (ROADM) systems, open line systems, fixed-grid systems, and flex-grid systems.

Figure 2:
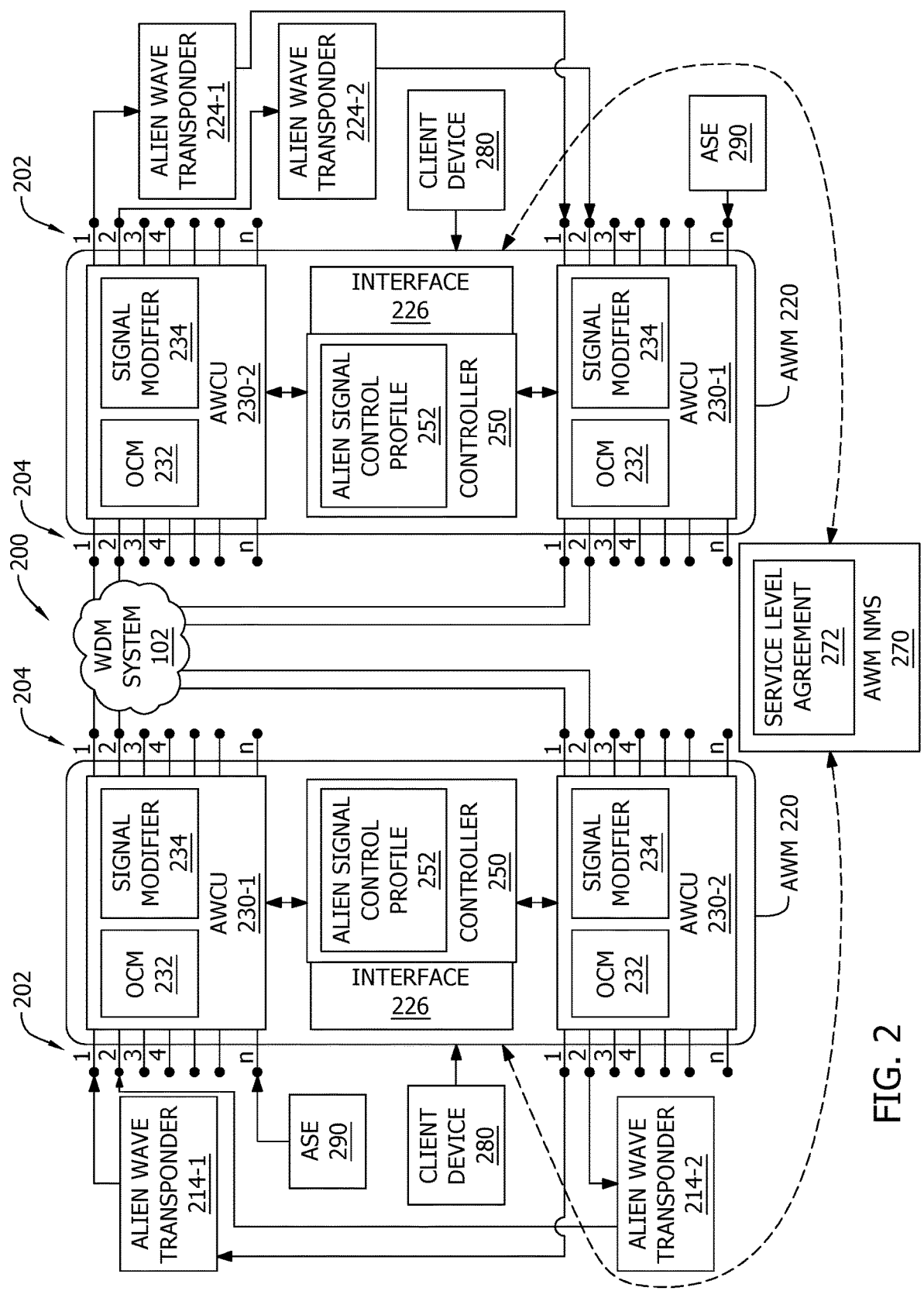
FIG. 2 is a block diagram of an alien wavelength management system in an illustrative embodiment.

FIG. 2 is a block diagram of an alien wavelength management system 200 in an illustrative embodiment. FIG. 2 illustrates that alien the wavelength managers (AWMs) 220 may each be equipped with the same or similar components including one or multiple integrated alien wave controller units (AWCU) 230 each configured to manage on-ramp or off-ramp functionality. That is, an AWM 220 may include a first AWCU 230-1 configured as an on-ramp device and a second AWCU 230-2 configured as an off-ramp device though both devices may have similar or identical hardware configurations. In this example, an AWM 220 is deployed to connect between alien ports 202 and channelization ports 204 on each side of the WDM system 102 to manage alien waves communicated between one or more pairs of alien wave transponders 214/224.

Accordingly, alien wave transponder 214-1 may communicate over the WDM system 102 with a corresponding alien wave transponder 224-1 by transmitting alien wavelength signals over a first port of a first AWCU 230-1 deployed as an on-ramp device and receiving alien wavelength signals over a first port of the second AWCU 230-2 deployed as an off-ramp device in a different AWM 220. Similarly, alien wave transponder 214-2 may communicate with corresponding alien wave transponder 224-2 by transmitting over a second port of the first AWCU 230-1 and receiving via a second port of the second AWCU 230-2. In some embodiments, and as shown in FIG. 2, an AWM 220 may manage multiple transponders connected to the same line system (e.g., WDM system 102). In other embodiments, the same AWM 220 may manage alien waves delivered over different line systems. For example, an AWM 220 may manage one pair of transponders 214-1/224-1 over one line system (e.g., WDM system 102) using first ports and second ports, and also manage another pair of transponders 214-2/224-2 over a separate line system using third ports and fourth ports.

Each AWCU 230 is coupled between the alien ports 202 and channelization ports 204 and includes an optical channel monitor (OCM) 232 and a signal modifier 234. The OCM 232 is any device or combination of devices configured to measure one or more signal parameters of an alien wavelength signal submitted to an ingress port. Measured signal parameters may include at least one of a signal power level, a signal spectral occupation (e.g., frequency or wavelength), and/or an optical signal-to-noise ratio (OSNR). The signal modifier 234 includes any device or combination of devices configured to modify alien wavelength signals before its continued transmission on an egress port.

The AWM 220 also includes a controller 250 configured to receive input of the alien wave parameters measured by the OCM 232 and generate control instructions for the signal modifier 234 based on whether the measured parameters are outside an acceptable signal parameter range. The controller 250 operates based on an alien signal control profile 252 that defines acceptable ranges of signal parameters for a port (e.g., a particular alien port 202 or channelization port 204). Types of acceptable alien wave ranges or thresholds include, for example, an acceptable signal level value range, an acceptable occupied spectrum, and/or an acceptable OSNR value range. The alien signal control profile 252 may define parameters for on-ramp and/or off-ramp alien wavelength signals.

With respect to on-ramp functionality, the first AWCU 230-1 receives alien wavelength signals from a source port (e.g., an alien port 202) of an alien wave transponder 214/224. The controller 250 is configured to direct the first AWCU 230-1 to either pass the alien wavelength signal (if compliant) or potentially modify the alien wavelength signal (if non-compliant) prior to transmission over the WDM system 102. By monitoring alien wavelength signals transmitted by a third-party transponder prior to transmission over the WDM system 102, the AWM 220 may advantageously detect early signs that threaten to degrade network performance and automatically initiate an appropriate level of action to protect the WDM system 102 based on the severity of the signal violation.

With respect to off-ramp functionality, the second AWCU 230-2 receives alien wavelength signals that have transmitted over the WDM system 102 to a channelization port 204 of a demultiplexer or channelization device. The controller 250 is configured to direct the second AWCU 230-2 to filter alien wavelength signals received from the WDM system 102 so that each alien wavelength signal is transmitted to a destination port of an alien wave transponder 214/224 intending to receive the signal. By preventing transponders from receiving other user's alien wavelength signals, the AWM 220 advantageously enables secure multi-vendor disaggregation. Additionally, the controller 250 may direct the second AWCU 230-2 to modify off-ramp alien wavelength signals to compensate for loss or automatically adjust to individual end-user specifications. In one embodiment, the AWM 220 includes the controller 250 as a centralized processing device configured to manage one or more first AWCUs 230-1 for on-ramp control and one or more second AWCUs 230-2 for off-ramp control. In an alternative embodiment, the AWM 220 may include one or multiple controllers 250 each configured as a dedicated processing device for a particular AWCU 230. Additional details of on-ramp and off-ramp functionality are provided in greater detail below.

As shown in FIG. 2, one of the ports of the AWM 220 (e.g., an alien port 202 of the first AWCU 230-1) may be coupled with an autonomous simultaneous emission (ASE) generator 290. The AWM 220 may thus be configured to substitute a violating alien wave signal with the equivalent channel filler that is generated by a non-modulated light source (e.g., ASE generator 290) and shaped to replicate alien wavelength (signal power and spectral occupation) by the deployed signal modifier 234. The AWM 220 also includes one or more interface(s) 226 to communicate with a locally connected client device 280 and/or one or more network devices of the alien wavelength management system 200. As shown in this example, the AWM 220 communicates with an alien wavelength management network management system (AWM NMS) 270. For instance, the AWM NMS 270 may provision the AWM 220 with the alien signal control profile 252 based on a service level agreement 272. Alternatively or additionally, a user may configure the alien signal control profile 252 using the client device 280 such as a mobile device or personal computer. The interface(s) 226 may therefore include one or more wired or wireless interfaces for communicating over public or private networks and/or a communication port for data exchange.

Additionally, the AWM 220 may provide network communications (e.g., via AWM NMS 270) to the network operator and/or end-user regarding management of alien wavelength signals. For example, the AWM 220 may propagate historical data through a network hierarchy for management of the WDM system 102. The AWM 220 may also provide messages, signal violation warnings, and/or corrective action notifications to end-users. Alternatively or additionally, notifications and the like may by sent by an EMS or BSS managing the AWM 220. Thus, in addition to protecting the performance of the WDM system 102 and providing secure disaggregation, the AWMs 220 facilitate automated end-user management features for a network operator. Additional details of operation and example configurations of the AWM 220 are discussed below.

Figure 3:
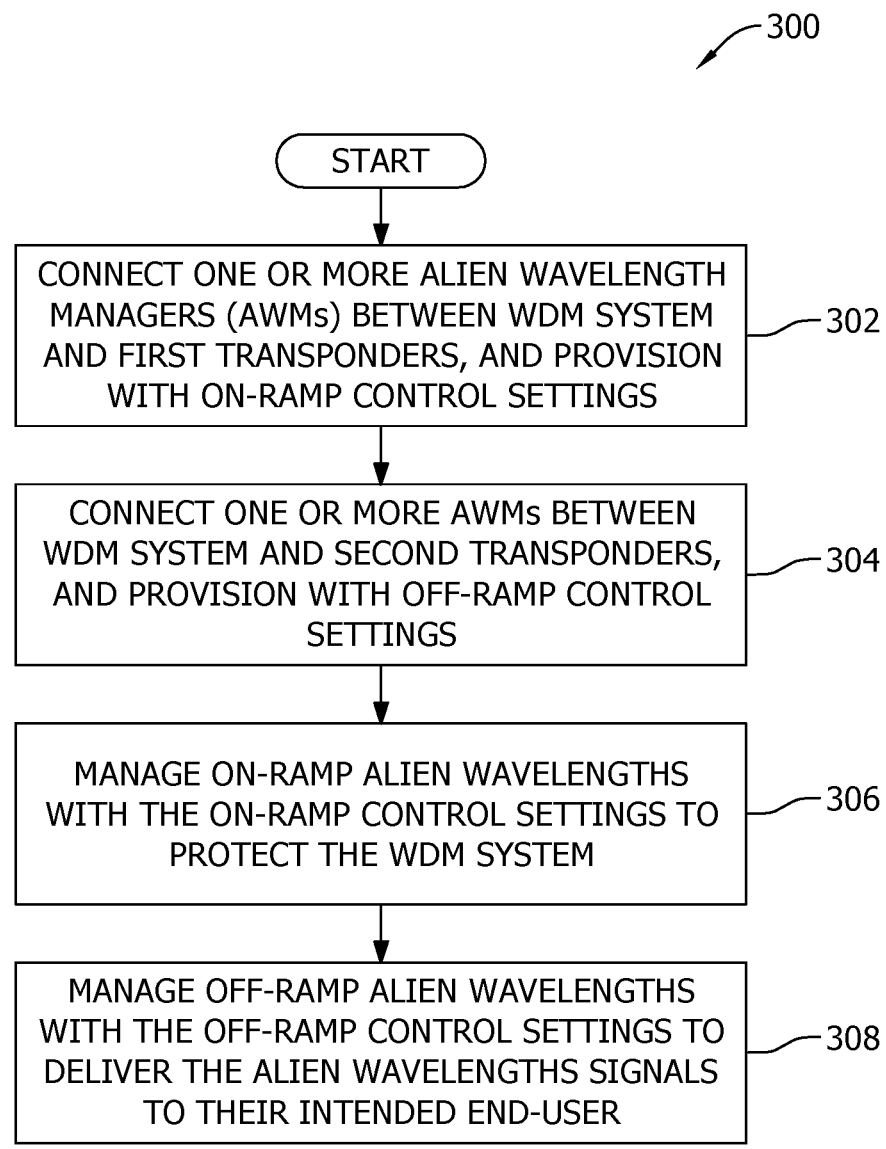
FIG. 3 is a flowchart of a method for managing alien wavelength signals in a Wavelength Division Multiplexing (WDM) system in an illustrative embodiment.

FIG. 3 is a flowchart of a method 300 for managing alien wavelength signals in a Wavelength Division Multiplexing (WDM) system in an illustrative embodiment. The steps of the flowcharts herein are described with reference to FIGS. 1-2, although the steps may be performed in other systems. The steps of the flowcharts described herein are not all inclusive and may include other steps not shown. The steps described herein may also be optionally performed in alternative orders.

In step 302, one or more AWMs 220 are connected between the WDM system 102 and first transponders, and each AWM 220 is provisioned with on-ramp control settings. Similarly, in step 304, one or more AWMs 220 are connected between the WDM system 102 and second transponders, and each AWM 220 is provisioned with off-ramp control settings. For example, in a unidirectional deployment, one AWM 220 may provide off-ramp control and another AWM 220 may provide off-ramp control.

In step 306, the AWMs 220 manage on-ramp alien wavelength signals with the on-ramp control settings to protect the WDM system 102. And, in step 308, the AWMs 220 manage off-ramp wavelength signals with the off-ramp control settings to deliver the alien wavelength signals to their intended end-user. Accordingly, the method 300 allows the WDM system 102 to expand with third-party equipment while protecting its performance and ensuring secure communications for its third-party end-users.

Figure 4:
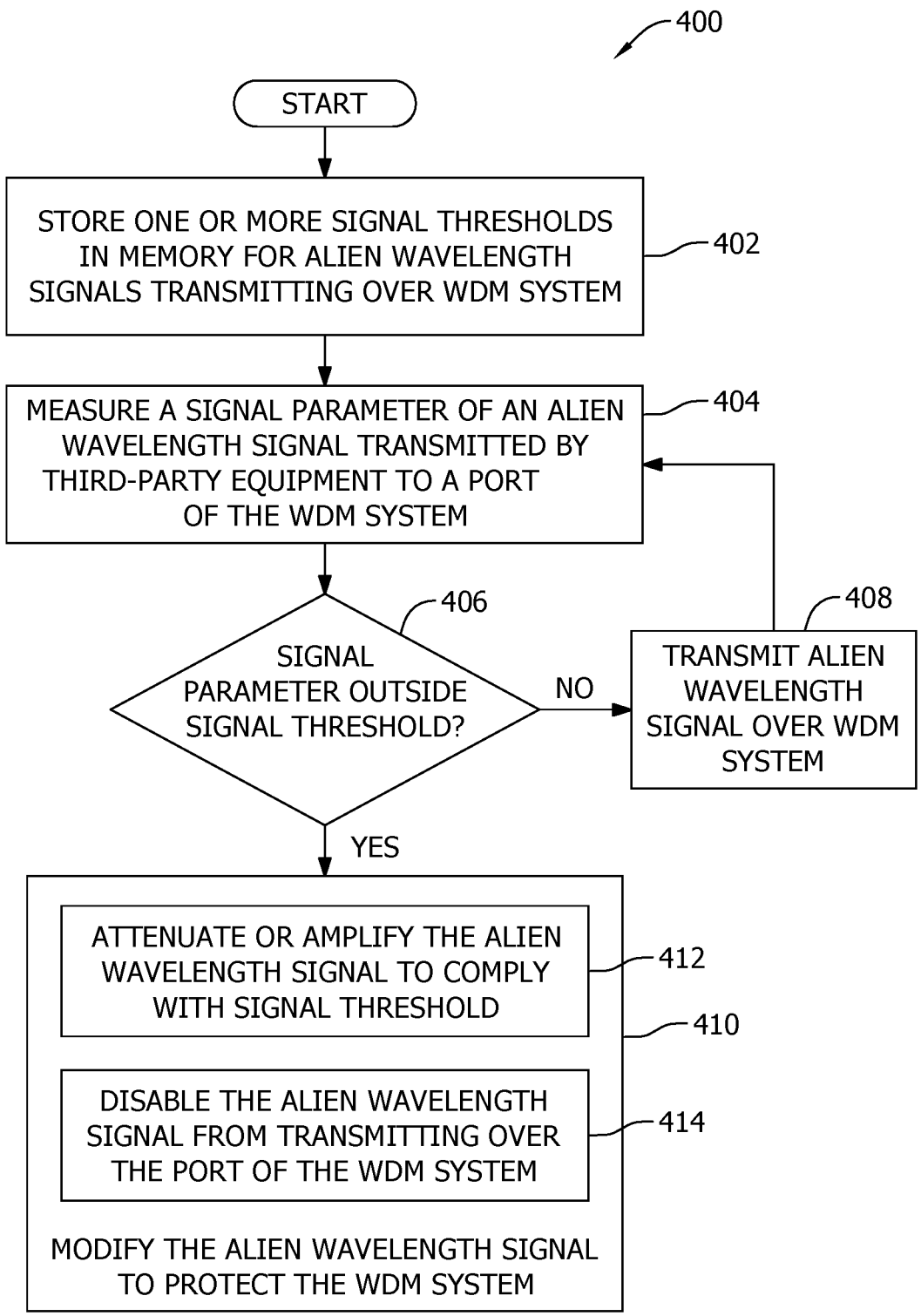
FIG. 4 is a flowchart of a method for managing on-ramp alien wavelength signals in a Wavelength Division Multiplexing (WDM) system in an illustrative embodiment.

FIG. 4 is a flowchart of a method 400 for managing on-ramp alien wavelength signals in a Wavelength Division Multiplexing (WDM) system in an illustrative embodiment. In step 402, the AWM 220 stores one or more signal thresholds in memory for alien wavelength signals transmitting over the WDM system 102. Signal thresholds may be defined in the alien signal control profile 252 of the controller 250 and include, for example, one or more first thresholds related to signal level, one or more second thresholds related to occupied spectrum, and/or one or more third thresholds related to an optical signal-to-noise ratio (OSNR). The signal thresholds pertain to an allowed value or range of an alien wavelength signal, which as previously discussed, is a signal generated by third-party equipment independently controlled from the WDM system 102.

In step 404, the AWM 220 measures a signal parameter of an alien wavelength signal transmitted by third-party equipment to a channelization port 204 of the WDM system 102. For example, the OCM 232 may monitor the C-band and/or L-band of the WDM system 102 and provide a signal power level, spectrum occupancy, and/or OSNR to the controller 250. In step 406, the controller 250 determines whether the signal parameter of the alien wavelength is outside the one or more signal thresholds stored in memory. If a signal parameter does not violate a threshold, the controller 250 directs the AWCU 230 (e.g., first AWCU 230-1) to transmit the alien wavelength to the channelization port 204 for delivery over the WDM system 102 (in step 408).

Otherwise, if one or more signal parameter(s) is outside a threshold, the method 400 proceeds to step 410 and the controller 250 directs the AWCU 230 (e.g., first AWCU 230-1) to modify the alien wavelength signal to protect the WDM system 102. Modification of the alien wavelength signal may include, in step 412, attenuation or amplification of the alien wavelength signal to comply with the signal threshold. Alternatively or additionally, modification of the alien wavelength signal may include, in step 414, disabling the alien wavelength signal from transmitting over the channelization port 204 of the WDM system 102. For example, if a power level, occupied spectrum, or OSNR of the alien wavelength signal is sufficiently outside an associated allowed value range, the first AWCU 230-1 blocks the alien wavelength signal to protect the WDM system 102. Thus, method 400 advantageously enables automatically adjusting or blocking of a non-compliant alien wavelength to protect the WDM system 102. Optionally, a blocked non-compliant alien wave signal may be substituted by a signal generated by the ASE generator 290 and shaped by the signal modifier 234.

Figure 5:
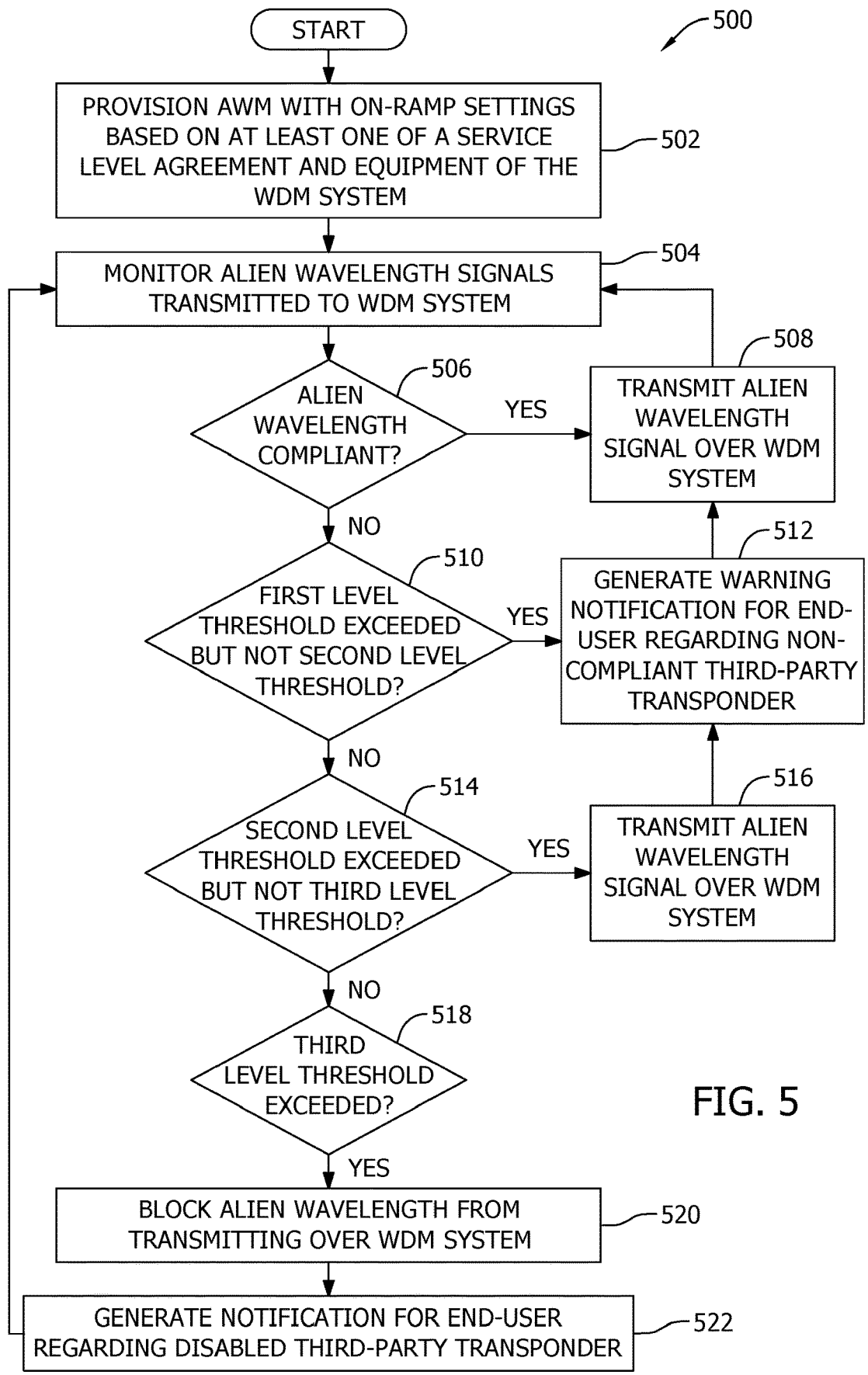
FIG. 5 is a flowchart of a method for managing on-ramp alien wavelength signals in a Wavelength Division Multiplexing (WDM) system in another illustrative embodiment.

FIG. 5 is a flowchart of a method 500 for managing on-ramp alien wavelength signals in a Wavelength Division Multiplexing (WDM) system in another illustrative embodiment. In step 502, an AWM 220 is provisioned with on-ramp settings based on at least one of a service level agreement and/or a characteristic of equipment of the WDM system 102. For example, a provisioning device such as the AWM NMS 270 may store a service level agreement 272 defining the levels of availability and performance of the WDM system 102 for an end-user and their associated third-party transponders. The service level agreement 272 may be referred to by a user for manually provisioning an AWM 220. Alternatively or additionally, the controller 250 may receive or generate the alien signal control profile 252 based on values defined in the service level agreement 272.

The alien signal control profile 252 may include on-ramp settings that define operational settings of the AWM 220 to associate and manage a port, transponder, and end-user. In particular, as previously described, the alien signal control profile 252 includes one or more signal thresholds that define restrictions for a given port of a transponder that, if adhered to, prevent interference with other transponders and degradation of the WDM system 102. Accordingly, by generating threshold values based on operational characteristics (e.g., line rate, modulation, number of channels, etc.) of the third-party equipment and/or equipment of the WDM system 102 (either as defined in the service level agreement 272 or imputed by hardware performance limitations), the AWM 220 is configured to prevent rogue transponders from degrading the performance of the WDM system 102 and/or other end-user equipment.

In step 504, the AWM 220 monitors alien wavelength signals transmitted to the WDM system 102. In step 506, the AWM 220 determines whether the alien wavelength signals are compliant with the on-ramp settings of the alien signal control profile 252. In particular, in this example, a port monitored by the AWM 220 is assigned an acceptable power level parameter value or range, a first level threshold representing minor deviation, a second level threshold representing major deviation, and a third level threshold representing critical deviation. For example, a critical power level threshold may be set based on a power level that risks disruption of the WDM system 102.

If the alien wavelength signal complies with associated thresholds, the AWM 220 transmits the alien wavelength signal over the WDM system 102 (in step 508). Otherwise, the method 500 proceeds to step 510 and the AWM 220 determines whether the monitored power is between the first level threshold and the second level threshold. If so, a minor deviation is indicated and the AWM 220 and/or its associated network management device (e.g., EMS 176 or BSS 170) generates a warning notification for the associated end-user (in step 512). The message may include information regarding the violation such as an identifier of the non-compliant transponder/port, instructions for correcting the non-complaint transponder/port, an allotted time or number of violations remaining before automatic modifying or blocking occurs, etc. In addition to sending the message, the AWM 220 allows transmission of the signal over the WDM system 102 (in step 508) and continues monitoring alien wavelength signals (in step 504).

In step 514, the AWM 220 determines whether the monitored power is between the second level threshold and the third level threshold. If so, a major deviation is indicated and the AWM 220 performs automatic corrective action to protect the WDM system 102. In particular, the method 500 proceeds to step 516 and the AWM 220 modifies the alien wavelength signal (e.g., by attenuating or amplifying the alien wavelength signal to the acceptable power level parameter value or range). The EMS 176 and/or BSS 170 may send a warning including details of the violation, modification, and other applicable information already described in step 512. Additionally, the AWM 220 transmits the modified alien wavelength signal over the WDM system 102 (in step 508) and continues monitoring alien wavelength signals (in step 504).

In step 518, in response to determining that the monitored power exceeds the third level threshold, the AWM 220 blocks the alien wavelength from transmitting over the WDM system 102 (in step 520) and generates a notification of the block to the associated end-user (in step 522). In one embodiment, the third level threshold may be set based, at least in part, on the hardware capabilities of the first AWCU 230-1 for attenuation and/or amplification. For example, a third-party transponder may transmit an alien wavelength signal at a power level that either cannot be sufficiently modified by the first AWCU 230-1 or threatens immediate disruption the WDM system 102 or other end-users. By blocking the rogue third-party transponder from transmitting alien wavelength signals with such critical power deviations, the method 500 ensures the performance of the WDM system 102 operates as expected for all other third-party transponders.

Additionally, the method 500 advantageously implements a tiered approach enabling opportunities to correct alien wavelength signals based on severity of violation. Warning messages generated/transmitted by the AWM 220, EMS 176, and/or BSS 170 allow an end-user some degree of flexibility in adjusting their third-party equipment to remain operating with the WDM system 102 to prevent downstream complications for the WDM system 102 with no or minimal involvement by network management personnel. In some embodiments, message generating/sending described above in steps 512/522 may trigger sending notification of signal violation events to a network management entity to facilitate management of the third-party transponders and maintaining performance of the WDM system 102.

Figure 6:
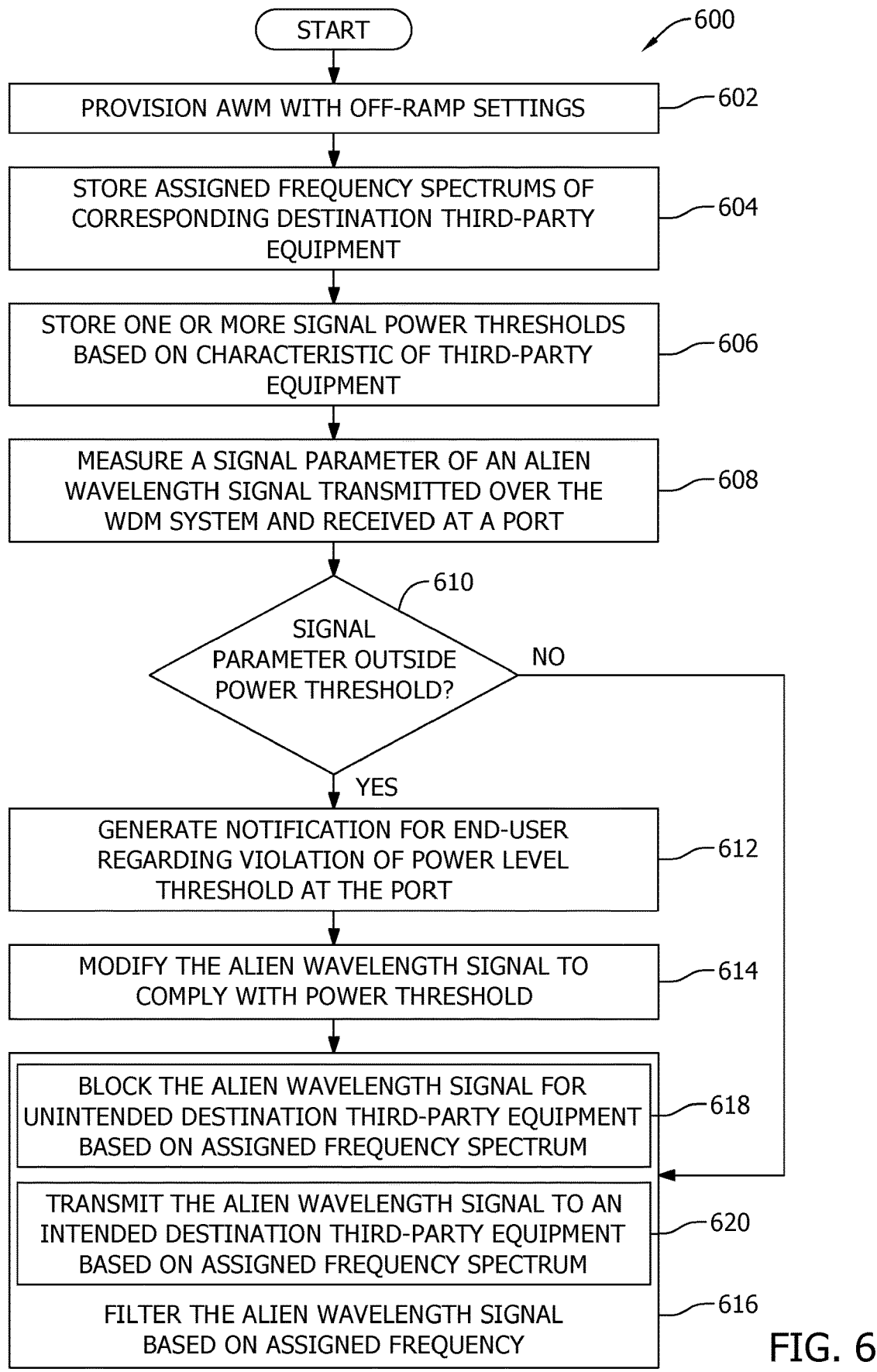
FIG. 6 is a flowchart of a method for managing off-ramp alien wavelength signals in a Wavelength Division Multiplexing (WDM) system in an illustrative embodiment.

FIG. 6 is a flowchart of a method 600 for managing off-ramp alien wavelength signals in a Wavelength Division Multiplexing (WDM) system in an illustrative embodiment. In step 602, an AWM 220 is provisioned with off-ramp settings. Similar to that described above with on-ramp settings, the alien signal control profile 252 may include off-ramp settings that define operational settings for the AWM 220 to associate and manage a port, transponder, and end-user. In one embodiment, the off-ramp settings are set based on one or more characteristics of the customer's receiving or destination third-party equipment (e.g., alien WDM destination device 124).

In step 604, the AWM 220 stores one or more assigned frequency spectrums of corresponding destination third-party equipment for receiving alien wavelength signals. As previously indicated, the alien wavelength signals are generated by source third-party equipment independently controlled from the WDM system 102. In step 606, the AWM 220 stores one or more signal power thresholds based on one or more characteristics of third-party equipment. For example, the power level threshold may be set based on a distance between the channelization port 204 of the WDM system 102 and the destination third-party equipment.

In step 608, the AWM 220 measures a signal parameter of an alien wavelength signal transmitted over the WDM system 102 and received at a channelization port 204. In step 610, the AWM 220 determines whether a measured power level of the alien wavelength is outside a power level threshold stored in memory. If so, the AWM 220 generates a notification for an end-user of the destination third-party equipment regarding violation of the power level threshold at the channelization port 204 (in step 612). Alternatively or additionally, the AWM 220 modifies (e.g., attenuates or amplifies) the alien wavelength signal to a power level within the power level threshold to create a modified alien wavelength signal (in step 614). If, however, the power threshold is not violated, the method 600 may skip steps 612-614.

In step 616, the AWM 220 filters the alien wavelength signal based on a assigned frequency (e.g., assigned to particular end-user/device in step 604). Filtering in step 616 may include blocking the alien wavelength signal for unintended destination third party equipment based on their associated assigned frequency spectrum (step 618), and/or transmitting the alien wavelength signal to an intended destination third-party equipment based on its associated assigned frequency spectrum (step 620). The method 600 performed by one or more AWMs 220 thus ensures that alien wavelengths coming of the WDM system 102 are correctly routed to their intended device. This secures communications sent via alien wavelength signals over the WDM system 102 by preventing end-users from receiving other end-user's signals at the off-ramp side.

In one embodiment, the controller 250 directs the second AWCU 230-2 to filter the alien wavelength signal by configuring a Microelectromechanical Systems (MEMS) filter or Wavelength Selective Switch (WSS) to filter signals outside the assigned frequency spectrum. For example, the filter blocks the alien wavelength signal to other destination third-party equipment with assigned frequency spectrums not corresponding to the assigned frequency, and the filter transmits the alien wavelength signal to a destination third-party equipment with an assigned frequency spectrum corresponding to the measured frequency. Additionally, if the power level of the alien wavelength signal is adjusted automatically by the AWM 220, the modified alien wavelength signal is filtered/transmitted to the intended destination third-party equipment at a power level that is compatible with the third-party equipment. Example embodiments and further operational details are described below.

Figure 7:
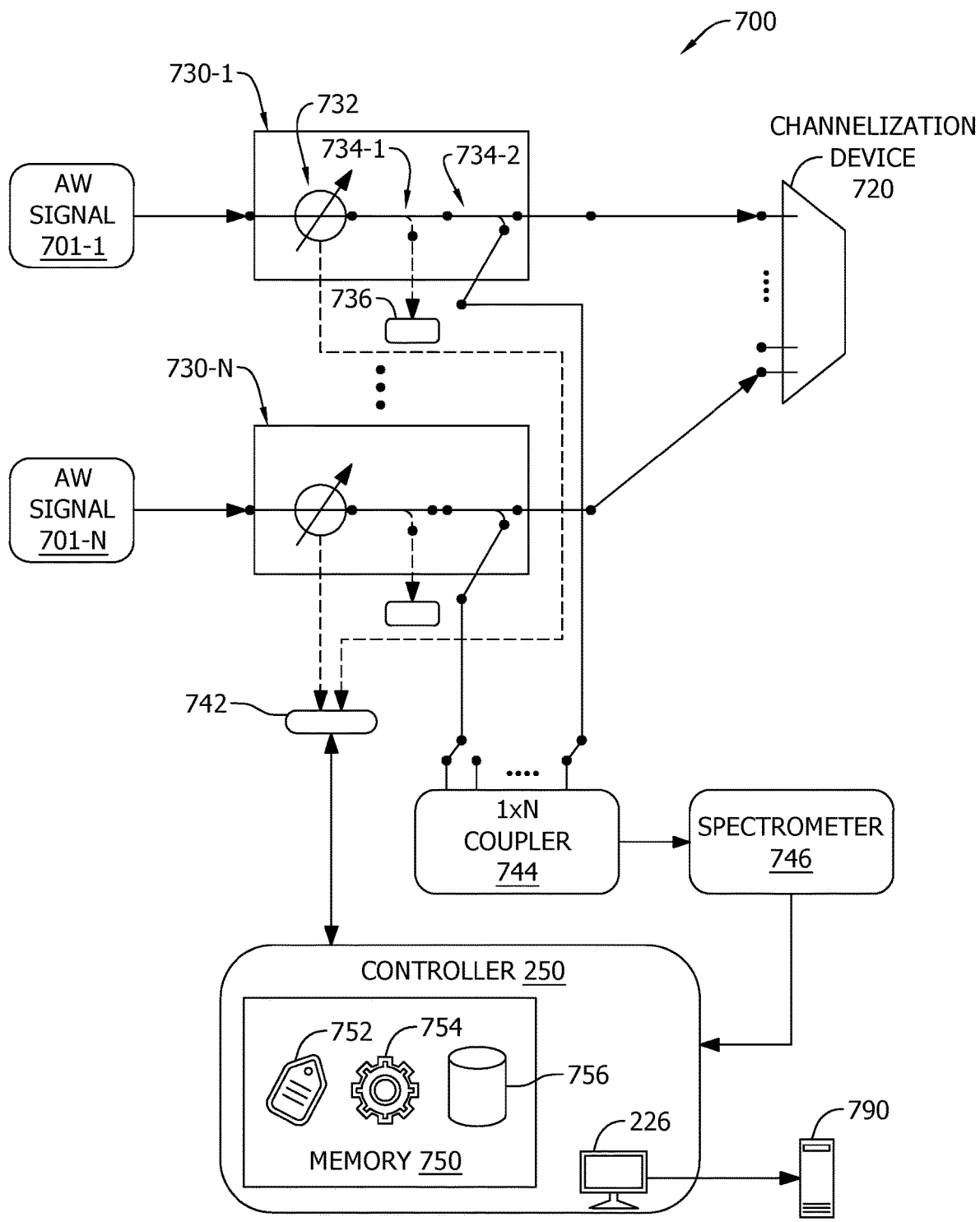
FIG. 7 is a diagram of an alien wavelength manager (AWM) in an illustrative embodiment

FIG. 7 is a diagram of an alien wavelength manager (AWM) 700 in an illustrative embodiment. In this example, the AWM 700 includes a series of alien wavelength control units (AWCUs) 730 configured to receive corresponding alien wavelength signals 701 from corresponding source devices (not shown). Each AWCU 730 is coupled along a signal or line path between an alien source port and a channelization port of the WDM system 102. Additionally, each AWCU 730 is coupled with the controller 250. A coupler 744 enables the controller 250 to manage multiple AWCUs 730 and corresponding ports and alien wavelength signals. Each AWCU 730 includes a Variable Optical Attenuator (VOA) 732, one or more optical taps 734, and a PIN diode 736. Each VOA 732 is coupled with the controller 250 via an electrical interface 742. In one embodiment, a first optical tap 734-1 is disposed downstream of the VOA 732 in the signal direction and is coupled with the PIN diode 736, and a second optical tap 734-2 is disposed downstream from the first optical tap 734-1 and coupled with the controller 250 via the coupler 744 and spectrometer 746.

The controller 250 includes or communicates with memory 750 configured to store alien wave properties 752, configuration settings 754, and an alien wave event database 756. The alien wave properties 752 include signal parameters measured by the AWCU 730 such as a power level measured via the PIN diode 736 and/or a power level or spectral occupation measured by the spectrometer 746 after the signal splits from the optical tap 734 (e.g., second optical tap 734-2) and routes through the coupler 744. Accordingly, the spectrometer 746 may execute a measurement on a signal provided by the optical tap 734 to detect one or more values including a signal level, spectral occupation, and/or frequency envelope of the signal. The configuration settings 754 may include on-ramp and/or off-ramp settings (e.g., service level agreements pertaining to end-users), thresholds, port/equipment assignments, etc.

The alien wave event database 756 stores historical data related to alien wavelength signals monitored by the AWM 700. Historical data may include, for example, a record of threshold violations of a particular transponder or end-user, a record of warnings sent to a particular transponder or end-user, and/or a record of corrective actions taken by the AWM 700 or end-user to correct or block violating alien wavelength signals. The controller 250 generates events based on historical data in the alien wave event database 756 to flag violations to an end-user and/or a ticketing system 790 via interface 226 (e.g., using Simple Network Management Protocol (SNMP)). For example, similar to that previously described, the controller 250 may send a warning message, or minor alarm, to a network management device (e.g., ticketing system 790, AWM NMS 270, EMS 176, and/or BSS 170) indicating that the parameters of a third-party customer's signal are outside of normal but that no corrective action is yet to be performed. If the parameters degrade or persist for a predefined period of time, the warning message may indicate that the parameters of their alien wavelength signals are beyond the end-users allowed parameters such that corrective action is being performed.

For on-ramp applications, the controller 250 is configured, in response to determining that a signal parameter (e.g., power level or spectral occupation) received from a particular AWCU 730 is violating a threshold assigned for that AWCU 730, to direct the AWCU 730 to modify the alien wavelength signal before it is transmitted over the WDM system 102 via the corresponding port of a channelization device 720 (e.g., DWDM multiplexer/demultiplexer). For example, with respect to power level violations, the controller 250 is configured to direct the VOA 732 to amplify the alien wavelength to a power level within the threshold and/or to direct a shutter mechanism of the VOA 732 to break a transmission path of the alien wavelength signal. The controller 250 may adjust the loss of the VOA 732 in an effort to maintain the signal level within limits that define safe operation of the WDM system 102.

Similarly, in the case that an alien wavelength signal does not conform with spectral properties (e.g., signal outside of allocated spectrum, deployment of the line rate, and/or signal not agreed with the end-user), the controller 250 is configured to direct the shutter to break the transmission path to avoid impact on the WDM system 102. In some cases, the controller 250 may protect operation of the WDM system 102 automatically by detecting that changes applied by an end-user to their transponder are impacting the WDM system 102 and applying corrective action to those changes.

Figure 8:
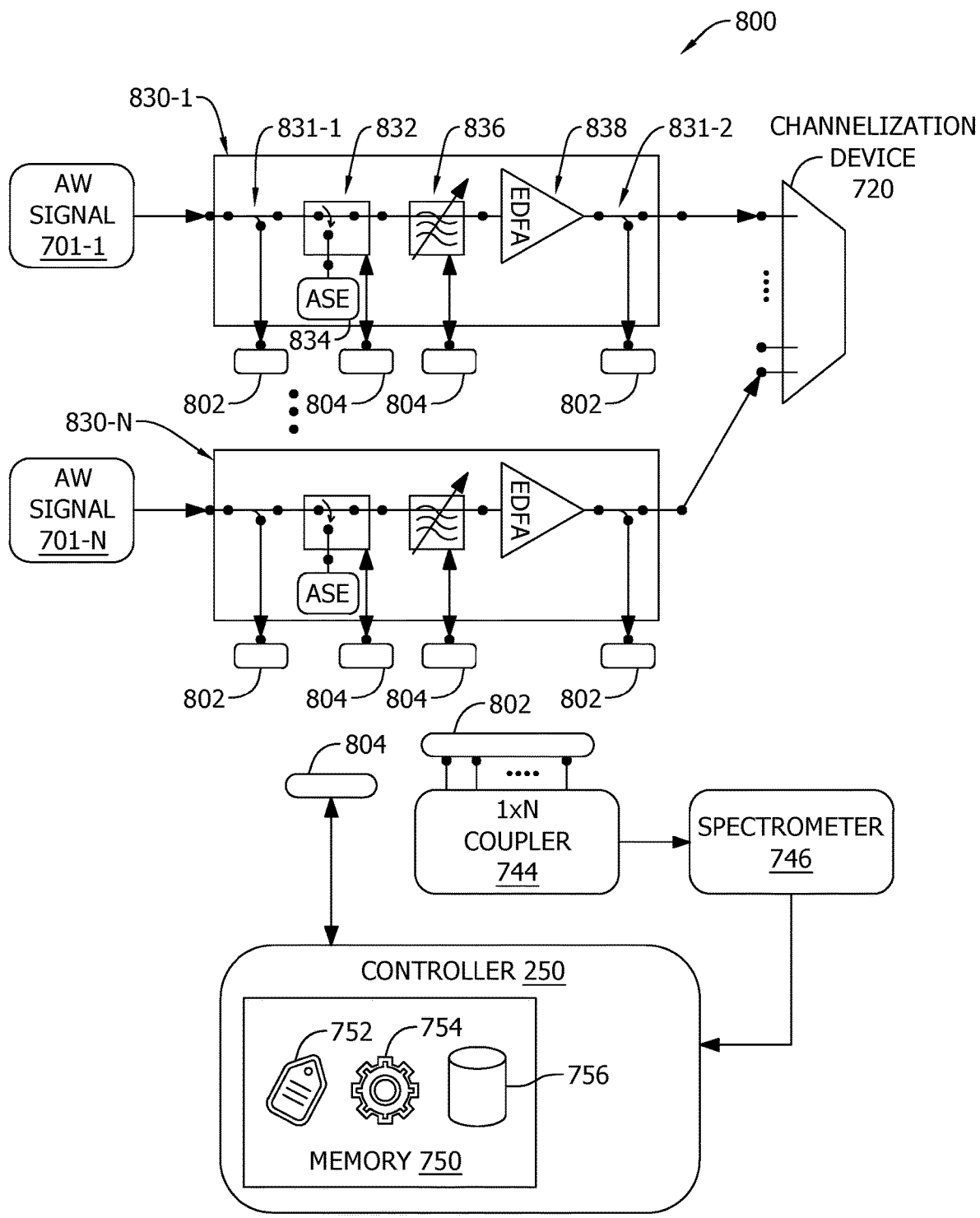
FIG. 8 is a diagram of an alien wavelength manager (AWM) in another illustrative embodiment.

FIG. 8 is a diagram of an alien wavelength manager (AWM) 800 in another illustrative embodiment. In this example, the AWM 800 includes a series of alien wavelength control units (AWCUs) 830 with another configuration, though description of elements previously described may be omitted for sake of brevity. Each AWCU 830 is deployed in-line with a corresponding customer or alien wavelength signal and enables data collection. In particular, the AWCU 830 includes optical taps 831 coupled with the controller 250 via optical interface(s) 802 to coupler 744 and spectrometer 746 for spectral analysis. Additionally, an optical switch 832, disposed after a first optical tap 831-1, enables the AWCU 830 to disconnect an alien wavelength signal that is violating the terms of a service level agreement (e.g., power or frequency envelope). An Amplified Spontaneous Emission (ASE) generator 834 coupled with the optical switch 832 is configured to replace the alien wavelength signal with noise to maintain channel load for the WDM system 102. The optical switch 832 is configured to disconnect a violating alien wavelength signal almost instantaneously (e.g., within milliseconds from the moment the AWM 800 measures that a third (or critical) threshold is exceeded, as previously described with respect to steps 518-520).

The AWCU 830 also includes a Microelectromechanical Systems (MEMS) filter 836 configured to block or filter the alien wavelength signal. The MEMS filter 836 is tunable and allows for strict control of frequency envelope allocated to an end-user. This may advantageously reduce the need for the AWM 800 to quickly detect and react to a violation of allocated spectrum. Additionally, the MEMS filter 836 allows sufficient dynamic range to attenuate an alien wavelength signal. The MEMS filter 836 may be disposed downstream from the optical switch 832, with the MEMS filter 836 and optical switch 832 coupled with the controller 250 via electrical interface(s) 804.

The AWCU 830 may also include an Erbium-Doped Fiber Amplifier (EDFA) 838 configured to amplify the alien wavelength signal to compensate for loss introduced by other components of the AWCU 830 (e.g., loss incurred by optical taps 831, optical switch 832, and MEMS filter 836). A second optical tap 831-2 disposed downstream from the EDFA 838 enables signal measurement at the egress of the AWCU 830. In some embodiments, components of the AWCU 830 are integrated together and deployed in-line. In one embodiment, the coupler 744 and/or spectrometer 746 may be integrally included with the AWCU 830.

Figure 9:
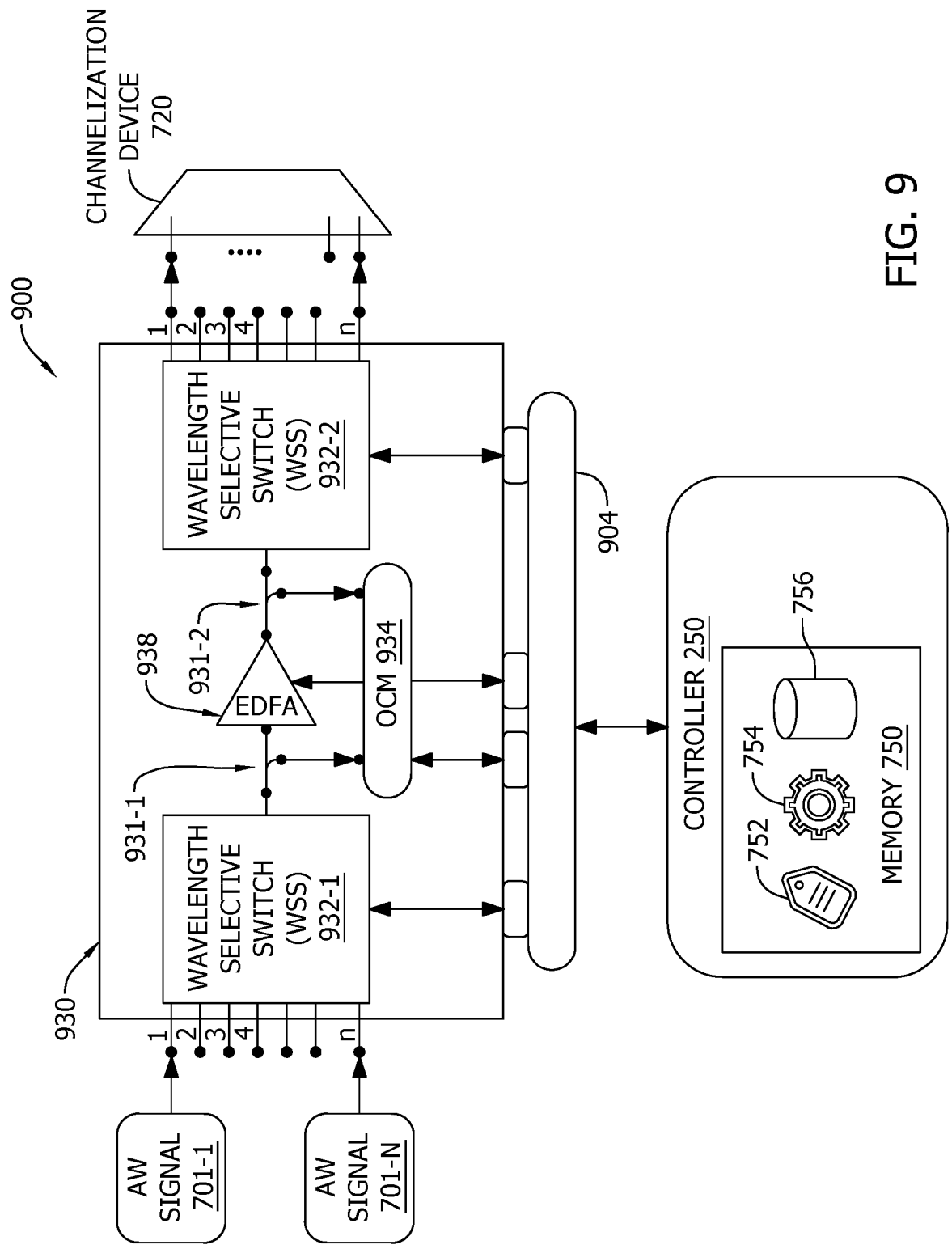
FIG. 9 is a diagram of an alien wavelength manager (AWM) in yet another illustrative embodiment.

FIG. 9 is a diagram of an alien wavelength manager (AWM) 900 in yet another illustrative embodiment. In this example, the AWM 900 includes an alien wavelength control unit (AWCU) 930 to monitor multiple ports of alien wavelength signals 701. In particular, the AWCU 930 includes a Wavelength Selective Switch (WSS) 932 configured to manage or modify one or more alien wavelength signals transmitting over one or more corresponding ports. The WSS 932 may include a twin-type, multi-port (e.g., twin 1×9) implementation with a first WSS card 932-1 and a second WSS card 932-2. The WSS 932 is coupled with the controller 250 via electrical interface(s) 904. Optionally, similar to that discussed above with respect to FIG. 8, the AWCU 930 may include an optical switch 832 (not shown in FIG. 9) deployed on egress ports of the AWM 900 to instantaneously disconnect a violating alien wave, thus protecting the line system from changes introduced by an alien wavelength that is exceeding the third level threshold.

In between the ingress/egress of the WSS 932, the AWCU 930 includes a first optical tap 931-1, an EDFA 938, and a second optical tap 931-2. The optical taps 931 couple with an optical channel monitor 934 configured to measure signal parameters and provide the parameters to the controller 250 via respective electrical interface(s) 904. The EDFA 938 compensates loss between the input WSS (e.g., first WSS card 932-1) and output WSS (second WSS card 932-2) to output signal power levels at a similar level. The controller 250 is configured to manage on-ramp and off-ramp signals by controlling the amount of loss by configuring the first WSS card 932-1 and the second WSS card 932-2.

As earlier described, the on-ramp application protects the WDM system 102 from non-conforming alien waves, and the off-ramp application ensures that each end-user receives only their own signals and not the signals of other end-users. Accordingly, although FIGS. 8-9 represent the on-ramp direction, the AWMs 800/900 may be similarly configured to manage alien wavelength signals in the off-ramp direction (e.g., from one or more ports of a de-channelization device to one or more destination third-party transponders). That is, the AWCUs 830/930 may be similarly configured in an opposite direction, with the controller 250 configured to direct the AWCUs 830/930 to modify alien wavelength signals coming off the channelization device 720 prior to transmitting to third-party equipment. Moreover, one technical benefit of the AWM 900 with inclusion of the WSS 932 is the ability to manage alien wavelength signals transmitting over multiple ports with an integrated hardware device having fewer internal components. The AWMs 800/900 advantageously facilitate improved operation and expandability of the WDM system 102 with automatic communication of events and changes with the appropriate users and operators (e.g., via OSS/BSS systems).

Figure 10:
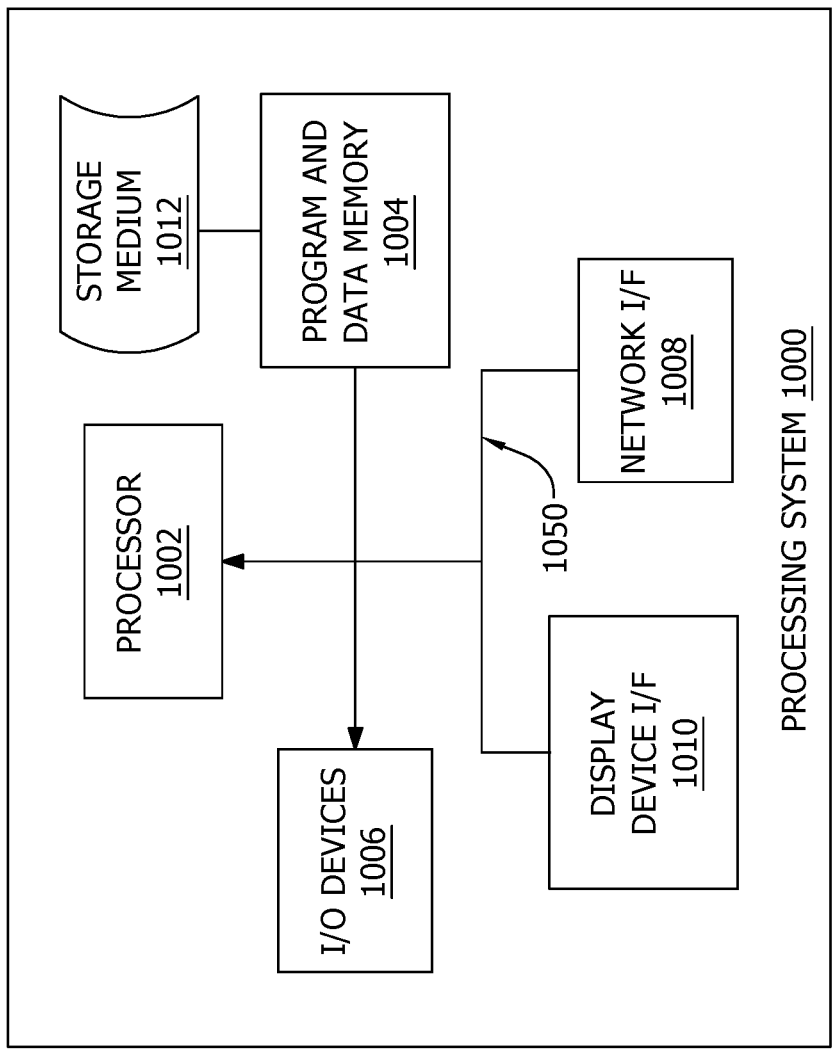
FIG. 10 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of a system or component described herein to perform the various operations disclosed herein. FIG. 10 illustrates a processing system 1000 operable to execute a computer readable medium embodying programmed instructions to perform desired functions in an illustrative embodiment. Processing system 1000 is operable to perform the above operations by executing programmed instructions tangibly embodied on computer readable storage medium 1012. In this regard, embodiments can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 may be integrated with the system to interface to one or more display devices, such as printing systems and screens for presentation of data generated by processor 1002.

Although specific embodiments were described herein, the scope of the invention is not limited to those specific embodiments. The scope of the invention is defined by the following claims and any equivalents thereof.

What is claimed is:

1. An apparatus for managing alien wavelengths for a Wavelength Division Multiplexing (WDM) system, the apparatus comprising:
   memory configured to store one or more signal thresholds for alien wavelength signals transmitting over the WDM system, wherein the alien wavelength signals comprise signals generated by third-party equipment independently controlled from the WDM system;
   an Alien Wavelength Control Unit (AWCU) coupled between the third-party equipment and a channelization port of the WDM system, the AWCU configured to measure a signal parameter of an alien wavelength signal transmitted by the third-party equipment to the channelization port; and
   a controller coupled with the AWCU and configured, in response to determining that the signal parameter is outside the one or more signal thresholds of the WDM system, to direct the AWCU to modify the alien wavelength signal to protect the WDM system,
   wherein the controller is configured to:
      in response to determining that a measured power level of the alien wavelength deviates a first level from a threshold, generate a warning message for an end-user of the third-party equipment regarding non-compliance of the alien wavelength signal,
      in response to determining that the measured power level of the alien wavelength deviates a second level from the threshold greater than the first level, direct the AWCU to attenuate or amplify the alien wavelength to a power level within the threshold to create a modified alien wavelength signal, and direct the AWCU to transmit the modified alien wavelength signal to the WDM system, and
      in response to determining that the measured power level of the alien wavelength deviates a third level from the threshold greater than the second level, direct the AWCU to disable the alien wavelength signal from transmitting over the WDM system.

2. The apparatus of claim 1 wherein:
   the AWCU includes a Variable Optical Attenuator (VOA) with a shutter,
   the controller is configured, in response to determining that the measured power level of the alien wavelength deviates the second level from the threshold, to direct the VOA to attenuate or amplify the alien wavelength to a power level within the threshold, and
   the controller is configured, in response to determining that the measured power level of the alien wavelength deviates the third level from the threshold, to direct the shutter to break a transmission path of the alien wavelength signal.

3. The apparatus of claim 1 wherein:
   the AWCU includes a PIN diode to measure a power level of the alien wavelength signal.

4. The apparatus of claim 1 wherein:
   the controller is configured, in response to determining that a measured spectral occupation of the alien wavelength signal is outside a spectral occupation range threshold stored in the memory, to direct the AWCU to disable the alien wavelength signal from transmitting over the WDM system.

5. The apparatus of claim 4 wherein:
   the AWCU includes an optical tap to split the alien wavelength signal; and
   the apparatus further includes a spectrometer to measure spectral occupation of the alien wavelength signal after it splits from the optical tap.

6. The apparatus of claim 4 wherein:
   the AWCU includes a Microelectromechanical Systems (MEMS) filter to block the alien wavelength signal.

7. The apparatus of claim 1 wherein:
   the AWCU includes a Wavelength Selective Switch (WSS) to modify the alien wavelength signal.

8. A method of managing alien wavelengths in a Wavelength Division Multiplexing (WDM) system, the method comprising:
   storing one or more signal thresholds in memory for alien wavelength signals transmitting over the WDM system, wherein the alien wavelength signals comprise signals generated by third-party equipment independently controlled from the WDM system;
   measuring a signal parameter of an alien wavelength signal transmitted by the third-party equipment to a channelization port of the WDM system;
   in response to determining that the signal parameter is outside the one or more signal thresholds of the WDM system, modifying the alien wavelength to protect the WDM system;
   in response to determining that a measured power level of the alien wavelength deviates a first level from a threshold, generating a warning message for an end-user of the third-party equipment regarding non-compliance of the alien wavelength signal;
   in response to determining that the measured power level of the alien wavelength deviates a second level from the threshold greater than the first level, attenuating or amplifying the alien wavelength to a power level within the threshold to create a modified alien wavelength signal, and transmitting the modified alien wavelength signal to the WDM system; and
   in response to determining that the measured power level of the alien wavelength deviates a third level from the threshold greater than the second level, disabling the alien wavelength signal from transmitting over the WDM system.

9. The method of claim 8 further comprising:
   coupling a Variable Optical Attenuator (VOA) and a shutter between the third-party equipment and the channelization port of the WDM system;
   in response to determining that the measured power level of the alien wavelength deviates the second level from the threshold, directing the VOA to attenuate or amplify the alien wavelength to a power level within the threshold; and
   in response to determining that the measured power level of the alien wavelength deviates the third level from the threshold, directing the shutter to break a transmission path of the alien wavelength signal.

10. The method of claim 8 further comprising:
    measuring a power level of the alien wavelength signal with a PIN diode.

11. The method of claim 8 further comprising:
    in response to determining that a measured spectral occupation of the alien wavelength signal is outside a spectral occupation range threshold stored in the memory, disabling the alien wavelength signal from transmitting over the WDM system.

12. The method of claim 11 further comprising:
    splitting the alien wavelength signal via an optical tap; and measuring the signal parameter of the alien wavelength signal with a spectrometer after the alien wavelength signal splits from the optical tap.

13. The method of claim 11 further comprising:
blocking the alien wavelength signal via a Microelectromechanical Systems (MEMS) filter in response to determining the measured spectral occupation of the alien wavelength signal is outside the spectral occupation range threshold.

14. The method of claim 8 further comprising:
modifying the alien wavelength signal with a Wavelength Selective Switch (WSS).

15. An apparatus for managing alien wavelengths for a Wavelength Division Multiplexing (WDM) system, the apparatus comprising:
memory configured to store one or more signal thresholds for alien wavelength signals transmitting over the WDM system, wherein the alien wavelength signals comprise signals generated by third-party equipment independently controlled from the WDM system;
an Alien Wavelength Control Unit (AWCU) coupled between the third-party equipment and a channelization port of the WDM system, the AWCU configured to measure a signal parameter of an alien wavelength signal transmitted by the third-party equipment to the channelization port; and
a controller coupled with the AWCU and configured, in response to determining that the signal parameter is outside the one or more signal thresholds of the WDM system, to direct the AWCU to modify the alien wavelength signal to protect the WDM system,
wherein the controller is configured, in response to determining that a measured spectral occupation of the alien wavelength signal is outside a spectral occupation range threshold stored in the memory, to direct the AWCU to disable the alien wavelength signal from transmitting over the WDM system,
wherein the AWCU includes an optical tap to split the alien wavelength signal, and
wherein the apparatus further includes a spectrometer to measure spectral occupation of the alien wavelength signal after it splits from the optical tap.

16. The apparatus of claim 15 wherein:
the controller is configured, in response to determining that a measured power level of the alien wavelength is outside a power level threshold stored in the memory, to direct the AWCU to attenuate or amplify the alien wavelength to a power level within the power level threshold to create a modified alien wavelength signal, and to direct the AWCU to transmit the modified alien wavelength signal to the WDM system.

17. The apparatus of claim 15 wherein:
the controller is configured, in response to determining that a measured power level of the alien wavelength is outside a critical power level threshold stored in the memory, to direct the AWCU to disable the alien wavelength signal from transmitting over the WDM system.

18. A method of managing alien wavelengths in a Wavelength Division Multiplexing (WDM) system, the method comprising:
storing one or more signal thresholds in memory for alien wavelength signals transmitting over the WDM system, wherein the alien wavelength signals comprise signals generated by third-party equipment independently controlled from the WDM system;
measuring a signal parameter of an alien wavelength signal transmitted by the third-party equipment to a channelization port of the WDM system;
in response to determining that the signal parameter is outside the one or more signal thresholds of the WDM system, modifying the alien wavelength to protect the WDM system;
in response to determining that a measured spectral occupation of the alien wavelength signal is outside a spectral occupation range threshold stored in the memory, disabling the alien wavelength signal from transmitting over the WDM system;
splitting the alien wavelength signal via an optical tap; and
measuring the signal parameter of the alien wavelength signal with a spectrometer after the alien wavelength signal splits from the optical tap.

19. The method of claim 18 further comprising:
in response to determining that a measured power level of the alien wavelength is outside a power level threshold stored in the memory, attenuating or amplifying the alien wavelength to a power level within the power level threshold to create a modified alien wavelength signal, and transmitting the modified alien wavelength signal to the WDM system.

20. The method of claim 18 further comprising:
in response to determining that a measured power level of the alien wavelength is outside a critical power level threshold stored in the memory, disabling the alien wavelength signal from transmitting over the WDM system.

* * * * *

UNITED STATES PATENT AND TRADEMARK OFFICE
CERTIFICATE OF CORRECTION

| | | |
|---|---|---|
| PATENT NO. | : 11,646,811 B2 | Page 1 of 1 |
| APPLICATION NO. | : 17/497142 | |
| DATED | : May 9, 2023 | |
| INVENTOR(S) | : Ljubomir Glavic et al. | |

It is certified that error appears in the above-identified patent and that said Letters Patent is hereby corrected as shown below:

On the Title Page

Item (71), the "Applicants:" list "Zayo Group, LCC" which should instead read "Zayo Group, LLC"

Signed and Sealed this
Nineteenth Day of December, 2023

Katherine Kelly Vidal
*Director of the United States Patent and Trademark Office*